June 2, 1970 TOMOKAZU KAZAMAKI ET AL 3,515,462

FISHEYE TYPE OBJECTIVE LENS SYSTEM

Filed Aug. 9, 1967 2 Sheets-Sheet 1

INVENTORS
TOMOKAZU KAZAMAKI
YASUO TAKAHASHI
BY Stanley Wolder
ATTORNEY

INVENTORS
TOMOKAZU KAZAMAKI
YASUO TAKAHASHI
BY Stanley Wolder
ATTORNEY

United States Patent Office 3,515,462
Patented June 2, 1970

3,515,462
FISHEYE TYPE OBJECTIVE LENS SYSTEM
Tomokazu Kazamaki and Yasuo Takahashi, Tokyo-to, Japan, assignors to Asahi Kogaku Kogyo Kabushiki Kaisha, Tokyo-to, Japan, a corporation of Japan
Filed Aug. 9, 1967, Ser. No. 659,449
Claims priority, application Japan, Aug. 25, 1966, 41/56,040
Int. Cl. G02b 3/00, 5/22, 9/00
U.S. Cl. 350—214                                    2 Claims

ABSTRACT OF THE DISCLOSURE

A bright, highly corrected fisheye lens system comprises ten lenses, the first, second and fifth lenses being negative meniscus lenses, the third and eight lenses being negative and the fourth, sixth, seventh, ninth and tenth lenses being positive. The third and fourth lenses are a cemented unit, the fifth and sixth lenses are a cemented unit, and the seventh, eighth and ninth lenses are a cemented unit. The lens system satisfies the following conditions:

$|r_7|>F, r_7<0$
$-F/0.15 \leq F_{1.2} \leq -F/1.5$
$4F>r_{13}>F$
$n_8-n_9>0.1$
$n_5>n_6, n_8>n_7, n_8>n_9$
$\nu 4<\nu 3$ wherein $r_7$ and $r_{13}$ are the radii of curvature of the rear face of the fourth lens and the front face of the ninth lens respectively; F is the resultant focal length of the entire lens system; $F_{1.2}$ is the resultant focal length of the first two lenses, the index of refraction of the ith lens is $n_i$, and the Abbe value of the ith lens is $\nu i$.

BACKGROUND OF THE INVENTION

The present invention relates generally to improvements in camera objective lens systems and it relates particularly to an improved camera wide angle objective lens system of the fisheye type.

The conventional fisheye lens systems employed in cameras are relatively of low brightness and are generally characterized by a low efficiency, the defect being covered by the high depth of focus effect in many cases. The fisheye lens systems heretofore available and proposed possess additional drawbacks and disadvantages. As a consequence fisheye objective lenses have limited applications and are usually employed only in outdoor photography.

SUMMARY OF THE INVENTION

A principal object of the present invention is to provide an improved lens system.

Another object of the present invention is to provide an improved camera wide angle objective lens.

Still another object of the present invention is to provide an improved fisheye objective lens system.

A further object of the present invention is to provide an improved highly corrected fisheye objective lens system of relatively high brightness and characterized by excellent optical properties.

The above and other objects of the present invention will become apparent from a reading of the following description taken in conjunction with the accompanying drawings which illustrate preferred embodiments thereof.

In a sense the present invention contemplates the provision of a lens system comprising ten lenses herein consecutively designated from the front to the rear as the first to the tenth lens, the first, second, third, fifth and eighth lenses being negative and the fourth, sixth, seventh, ninth and tenth lenses being positive and satisfying the following conditions:

(1) $\quad |r_7|>F, r_7<0$
(2) $\quad -F/0.5 \leq F_{1.2} \leq -F/1.5$
(3) $\quad 4F>r_{13}>F$
(4) $\quad n_8-n_9>0.1$
(5) $\quad n_5>n_6, n_8>n_7, n_8>n_9$
(6) $\quad \nu 4<\nu 3$ wherein $r_7$ and $r_{13}$ are the radii of curvature of the rear face of the fourth lens and the front face of the ninth lens respectively; F is the resultant focal length of the entire lens system: $F_{1.2}$ is the resultant focal length of the first two lenses: $n_i$ is the index of refraction of the ith lens; and $\nu 3$ and $\nu 4$ are the Abbe values of the third and fourth lenses respectively.

Advantageously the first second and fifth lenses are meniscus lenses with their front faces convex, and the third and fourth lens are cemented together as a unit, the fifth and sixth lenses are comented together as a unit and the seventh, eighth and ninth lenses are cemented together as a unit. A filter element may be positioned between the sixth and seventh lenses.

Of the above conditions which characterize the present lens system, condition (1) functions to correct coma aberration with respect to light rays whichare at a relatively large distance from the lens system optical axis. Condition (2) serves to increase the back focus of the lens system whereby to facilitate its application and usefulness with conventional cameras and is, in addition, required for effecting the maximum refraction of light rays of greater angle of incidence. The condition (2) also functions to reduce the diameter of the first lens to the greatest degree, too great a diameter of the front lens being an important drawback in ultra wide angle objectives of the present type.

Condition (3) in association and cooperation with condition (4) serves to minimize or prevent aggravation of coma aberration with respect to light rays of relatively small distance from the lens system optical axis. Condition (5) functions to prevent or minimize a decrease of the Petzval sum which is apt to result in objective lens systems of the present type, and condition (6) functions to minimize or prevent the aggravation of chromatic aberration caused at the first and second lenses.

The drawbacks and defects which characterize the conventional fisheye objective lens system are overcome and eliminated by the lens system in accordance with the present invention. The present lens system is of sufficient brightness to be readily usable in indoor photography and despite adverse conditions, is highly corrected with relation to the peripheral portion of the produced image. The present lens system exhibits an optical quality as high as good normal angle photographic objective lens systems in general use.

DESCRIPTION OF THE PREFERRED EMBODIMENTS

Figure 1:
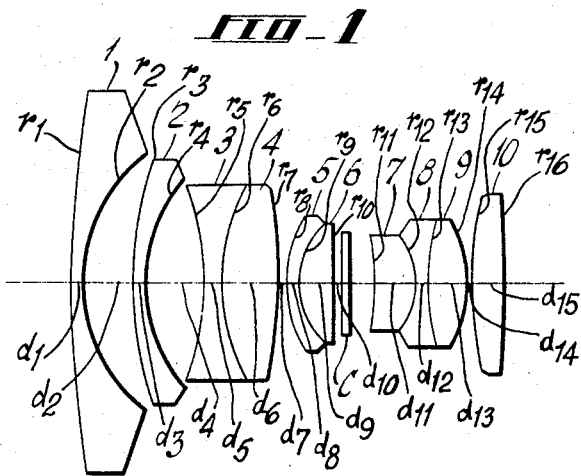
FIG. 1 is a longitudinal sectional view of an objective lens system embodying the present invention and provided with a filter element.

Referring now to the drawings and particularly FIG. 1 thereof which illustrates a preferred embodiment of the present invention as provided with a filter element, the improved lens system comprises ten coaxially positioned lenses designated successively as lenses 1 to 10 respectively. A filter element C of desired properties is positioned between the sixth lens 6 and the seventh lens 7. The third and fourth lenses 3 and 4 are cemented together with their confronting faces in mating registry to form a unit, the fifth and sixth lenses are cemented together with their confronting faces in mating registry to form a unit, and the seventh, eighth and ninth lenses 7, 8 and 9 are cemented together with their confronting faces in mating registry to form a unit.

The first lens 1 is a negative meniscus lens of thickness $d_1$ and refractive index $n_1$, and has a convex front face of radius of curvature $r_1$ and a concave rear face of radius of curvature $r_2$.

The second lens 2 is a negative meniscus lens spaced from lens 1 a distance $d_2$, is of thickness $d_3$ and refractive index $n_2$ and has a convex front face of radius of curvature $r_3$ and a concave rear face of radius of curvature $r_4$.

The third and fourth lenses 3 and 4 are a cemented unit with the lens 3 being negative and spaced from lens 2 a distance $d_4$ and having a thickness $d_5$, a refractive index $n_3$, a concave front face with a radius of curvature $r_5$, and a concve rear face with radius of curvature $r_6$, and the lens 4 being positive and having a thickness $d_6$, a refractive index $n_4$, a convex front face of radius of curvature $r_6$ mating the rear face of lens 3 and a convex rear face of radius of curvature $r_7$.

The fifth and sixth lenses 5 and 6 are a cemented unit with the lens 5 being a negative meniscus lens spaced from lens 4 a distance $d_7$ and having a thickness $d_8$, a refractive index $n_5$, a convex front face of radius of curvature $r_8$ and a concave rear face of radius of curvature $r_9$, and the lens 6 being positive and having a thickness $d_9$, a refractive index $n_6$, a convex front face of radius of curvature $r_9$, mating the rear face of lens 5, and a convex rear face of radius of curvature $r_{10}$.

The filter C is positioned a distance $d_{10}$ from the lens 6 and has flat front and rear faces.

The seventh, eighth and ninth lenses 7, 8 and 9 are a cemented unit, the lens 7 being positive and having a thickness $d_{11}$, a refractive index $n_7$, a concave front face of radius of curvature $r_{11}$ and a convex rear face of radius of curvature $r_{12}$, the lens 8 being negative and having a thickness $d_{12}$ and a refractive index $n_8$, a concave front face of radius of curvature $r_{12}$ mating the rear face of lens 7 and a concave rear face of radius of curvature $r_{13}$, and the lens 9 being positive and having a thickness $d_{13}$ and a refractive index $n_9$, a convex front face of radius of curvature $r_{13}$ mating the rear face of lens 8 and a convex rear face of radius of curvature $r_{14}$.

The tenth lens 10 is positive and spaced from lens 9 a distance $d_{14}$ and has a thickness $d_{15}$, a refractive index $n_{10}$, a convex front face of radius of curvature $r_{15}$ and a convex rear face of radius of curvature $r_{16}$.

It should be noted that the lens spacings are measured axially between the confronting faces of the correspondingly spaced lenses. The dimensions, relationships and parameters of lenses are such as to satisfy the conditions previously set forth.

The following Table 1 sets forth the lens faces and radii of curvature, the lens spacings and thicknesses, and the refractive indices and Abbe values of a specific example of the present lens system provided with a filter C between the sixth and seventh lenses 6 and 7 and related to the above described embodiment as earlier indicated:

TABLE 1

| | | |
|---|---|---|
| $r_1 = 501.893$ | $d_1 = 7.98$ | $n_1 = 1.62041/60.3$ |
| $r_2 = 85.714$ | $d_2 = 24.52$ | |
| $r_3 = 207.565$ | $d_3 = 7.98$ | $n_2 = 1.62041/60.3$ |
| $r_4 = 85.548$ | $d_4 = 28.99$ | |
| $r_5 = -141.113$ | $d_5 = 7.98$ | $n_3 = 1.62041/60.3$ |
| $r_6 = 119.012$ | $d_6 = 33.99$ | $n_4 = 1.71736/29.5$ |
| $r_7 = -224.405$ | $d_7 = 0.20$ | |
| $r_8 = 71.869$ | $d_8 = 7.03$ | $n_5 = 1.70154/41.1$ |
| $r_9 = 43.452$ | $d_9 = 20.00$ | $n_6 = 1.51633/64.1$ |
| $r_{10} = -1,369.047$ | $d_{10} = 2.98$ | |
| $\infty$ | 4.20 | Filter |
| $\infty$ | 13.63 | |
| $r_{11} = -100.179$ | $d_{11} = 20.00$ | $n_7 = 1.56883/56.0$ |
| $r_{12} = -42.000$ | $d_{12} = 7.98$ | $n_8 = 1.76200/40.3$ |
| $r_{13} = 163.690$ | $d_{13} = 20.00$ | $n_9 = 1.51633/64.1$ |
| $r_{14} = -63.560$ | $d_{14} = 0.20$ | |
| $r_{15} = 311.827$ | $d_{15} = 20.00$ | $n_{10} = 1.58913/61.2$ |
| $r_{16} = -163.292$ | | |

It should be noted in the above that the filter C has a thickness of 4.20 and its rear face is spaced from the front face of the seventh lens 7 a distance 13.63. Moreover, the distance of 2.98 between the sixth lens 6 and the filter C is designated at $d_{10}$.

The following Table 2 sets forth the Siedel coefficients and their respective sums of the specific lens system of Table 1 which are determined with a diaphragm positioned between the sixth and seventh lenses 6 and 7.

TABLE 2

| | $S_1$ | $S_2$ | $S_3$ | P | $S_5$ |
|---|---|---|---|---|---|
| 1 | 0.001 | 0.008 | 0.035 | 0.076 | 0.488 |
| 2 | −1.968 | 0.060 | −0.001 | −0.446 | 0.013 |
| 3 | 0.745 | 0.282 | 0.106 | 0.184 | 0.110 |
| 4 | −6.809 | −0.041 | −0.000 | −0.447 | −0.002 |
| 5 | 0.001 | 0.021 | 0.284 | −0.271 | 0.180 |
| 6 | 2.665 | 0.026 | 0.000 | 0.029 | 0.000 |
| 7 | −0.027 | −0.079 | −0.234 | 0.186 | −0.140 |
| 8 | 31.803 | 1.871 | 0.110 | 0.573 | 0.040 |
| 9 | −20.154 | −0.170 | −0.001 | −0.165 | 0.001 |
| 10 | 0.009 | −0.021 | 0.049 | 0.024 | −0.173 |
| 11 | −0.001 | 0.006 | −0.032 | −0.000 | 0.170 |
| 12 | 0.001 | −0.006 | 0.032 | 0.000 | −0.170 |
| 13 | −3.207 | 0.855 | −0.227 | −0.361 | 0.157 |
| 14 | −16.010 | 0.403 | −0.010 | −0.166 | 0.004 |
| 15 | −10.813 | −2.083 | −0.401 | −0.056 | −0.088 |
| 16 | 17.302 | −0.565 | 0.018 | 0.535 | −0.018 |
| 17 | 0.736 | 0.394 | 0.211 | 0.118 | 0.177 |
| 18 | 12.105 | −0.754 | 0.046 | 0.227 | −0.017 |
| Sum | 6.337 | 0.206 | −0.012 | 0.041 | 0.731 |

Figure 3:
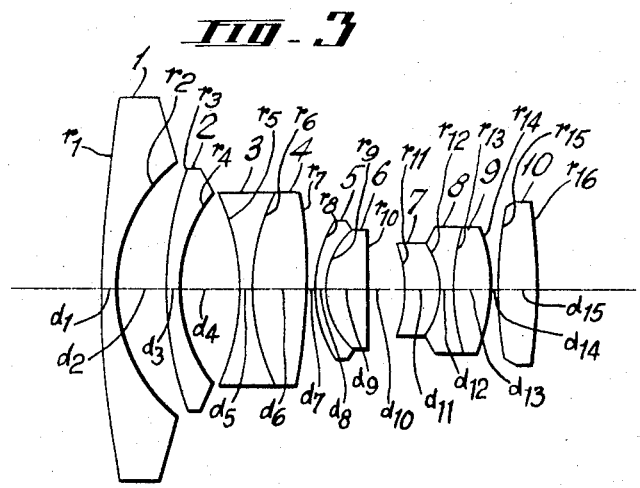
FIG. 3 is a view similar to FIG. 1 of a lens system substantially similar to that of FIG. 1 without a filter element.
Figure 4:
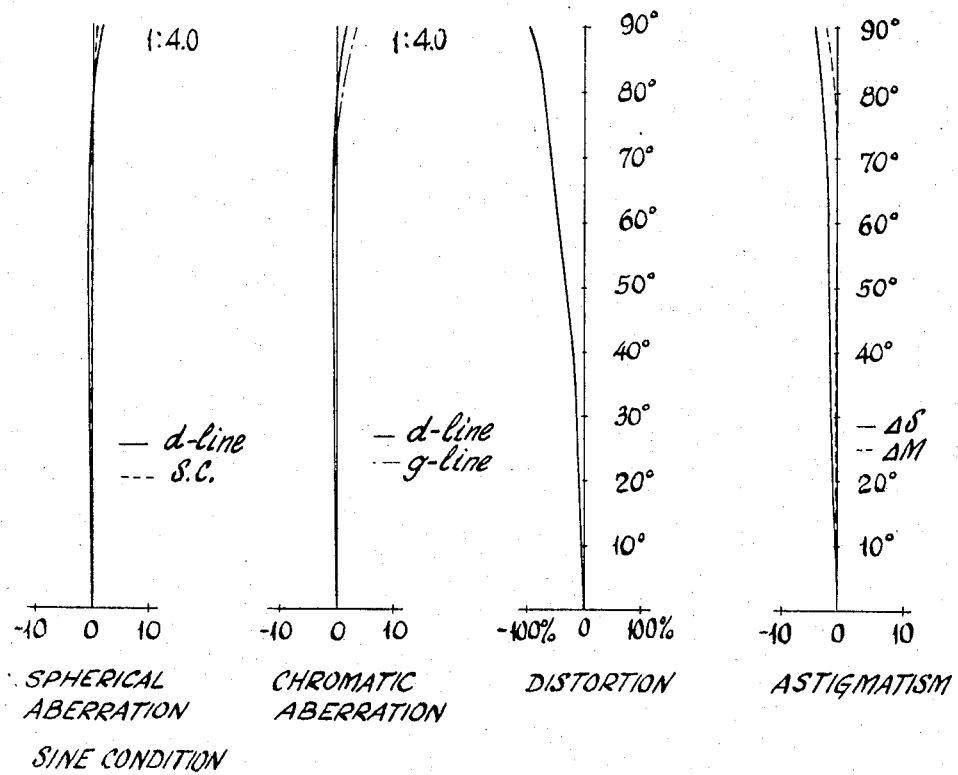
FIG. 4 is a set of aberration curves of the lens system of FIG. 3.

In FIGS. 3 and 4 of the drawings there are illustrated another embodiment of the present invention and the corresponding aberration curves. The improved lens system includes ten successive lenses 1 to 10, which except for the spacing between the sixth and seventh lenses and the omission of the filter C is similar to the lens system first described, the same reference numerals designating corresponding lenses. It should be noted that the distance between the sixth and seventh lenses is designated as $d_{10}$.

The following Table 3 sets forth the lens faces radii of curvature, the lens spacings and thicknesses, and the refractive indices and Abbe values of another specific example of the lens system of the present invention of the arrangement illustrated in FIG. 3, and Table 4 sets forth the Seidel coefficients and their respective sums of the lens system with a diaphragm between the sixth and seventh lenses 6 and 7.

TABLE 3

| | | |
|---|---|---|
| $r_1=501.893$ | $d_1=7.98$ | $n_1=1.62041/60.3$ |
| $r_2=85.714$ | $d_2=24.52$ | |
| $r_3=207.565$ | $d_3=7.98$ | $n_2=1.62041/60.3$ |
| $r_4=85.548$ | $d_4=28.99$ | |
| $r_5=-141.113$ | $d_5=7.98$ | $n_3=1.62041/60.3$ |
| $r_6=119.012$ | $d_6=33.99$ | $n_4=1.71736/29.5$ |
| $r_7=-224.405$ | $d_7=0.20$ | |
| $r_8=71.869$ | $d_8=7.03$ | $n_5=1.70154/41.1$ |
| $r_9=43.452$ | $d_9=20.00$ | $n_6=1.51633/64.1$ |
| $r_{10}=-1,369.047$ | $d_{10}=7.98$ | |
| $r_{11}=-100.179$ | $d_{11}=20.00$ | $n_7=1.56883/56.0$ |
| $r_{12}=-42.000$ | $d_{12}=7.98$ | $n_8=1.76200/40.3$ |
| $r_{13}=163.690$ | $d_{13}=20.00$ | $n_9=1.51633/64.1$ |
| $r_{14}=-63.560$ | $d_{14}=0.20$ | |
| $r_{15}=311.827$ | $d_{15}=20.00$ | $n_{10}=1.58913/61.2$ |
| $r_{16}=-163.417$ | | |

TABLE 4

| | $S_1$ | $S_2$ | $S_3$ | $P$ | $S_5$ |
|---|---|---|---|---|---|
| 1 | 0.001 | 0.008 | 0.035 | 0.076 | 0.490 |
| 2 | −1.968 | 0.039 | −0.000 | −0.446 | 0.008 |
| 3 | 0.745 | 0.290 | 0.112 | 0.184 | 0.115 |
| 4 | −6.809 | −0.112 | −0.001 | −0.447 | −0.007 |
| 5 | 0.001 | 0.021 | 0.285 | −0.271 | 0.186 |
| 6 | 2.665 | 0.054 | 0.001 | 0.029 | 0.000 |
| 7 | −0.027 | −0.080 | −0.235 | 0.186 | −0.145 |
| 8 | 31.803 | 2.204 | 0.152 | 0.573 | 0.050 |
| 9 | −20.154 | −0.381 | −0.007 | −0.165 | −0.003 |
| 10 | 0.009 | −0.021 | 0.049 | 0.024 | −0.172 |
| 11 | −3.215 | 0.834 | −0.216 | −0.361 | 0.150 |
| 12 | −16.054 | 0.295 | −0.005 | −0.166 | 0.003 |
| 13 | −10.844 | −2.160 | −0.430 | −0.056 | −0.096 |
| 14 | 17.349 | −0.448 | 0.011 | 0.535 | −0.014 |
| 15 | 0.738 | 0.400 | 0.217 | 0.118 | 0.182 |
| 16 | 12.112 | −0.673 | 0.037 | 0.226 | −0.014 |
| Sum | 6.351 | 0.270 | 0.005 | 0.040 | 0.733 |

Figure 2:
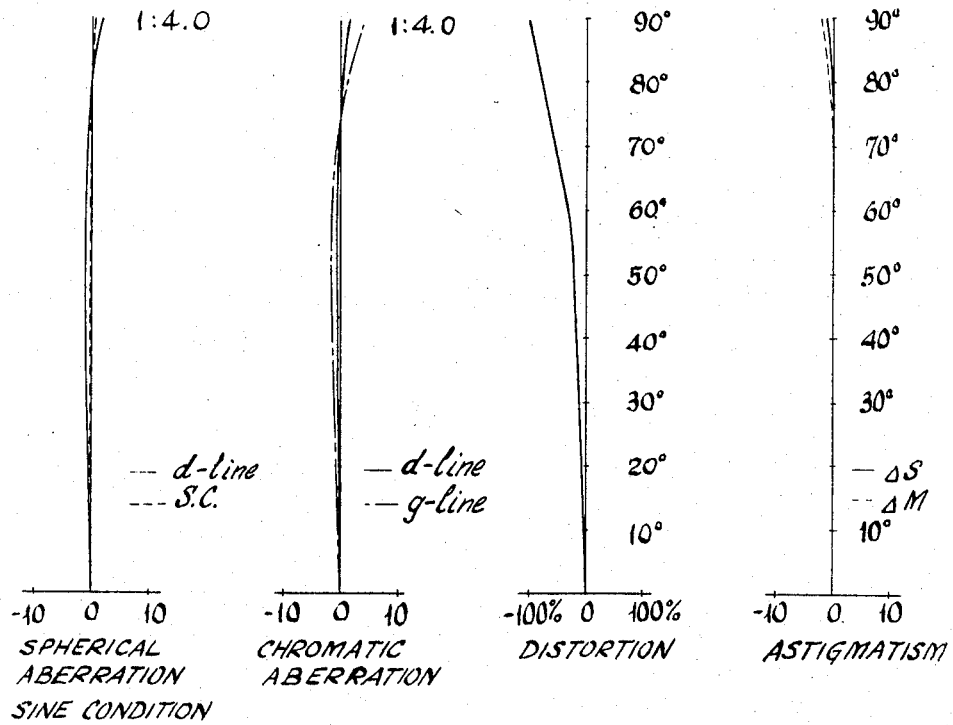
FIG. 2 is a set of aberration curves of the lens system of FIG. 1.

An inspection of the aberration curves in FIGS. 2 and 4 illustrates the high degree of correction of the various aberrations in the specific examples of the fisheye lenses according to the present invention.

While there have been described and illustrated preferred embodiments of the present invention it is apparent that numerous alterations, omissions and additions may be made without departing from the spirit thereof.

What is claimed is:

1. A lens system comprising ten lenses herein consecutively designated from the front to the rear as the first to the tenth lens, the third and fourth lenses, the fifth and sixth lenses, and the secenth, eighth and ninth lenses being cemented along their mating confronting surfaces to form three respective uints, the lens faces being here consecutively designated as the first to the sixteenth lens face wherein cemented confronting lens surfaces defining single lens faces, and a filter positioned between the sixth and seventh lenses, said lens system possessing the following dimensions and relationships:

| | | |
|---|---|---|
| $r_1=501.893$ | $d_1=7.98$ | $n_1=1.62041/60.3$ |
| $r_2=85.714$ | $d_2=24.52$ | |
| $r_3=207.565$ | $d_3=7.98$ | $n_2=1.62041/60.3$ |
| $r_4=85.548$ | $d_4=28.99$ | |
| $r_5=-141.113$ | $d_5=7.98$ | $n_3=1.62041/60.3$ |
| $r_6=119.012$ | $d_6=33.99$ | $n_4=1.71736/29.5$ |
| $r_7=-224.405$ | $d_7=0.20$ | |
| $r_8=71.869$ | $d_8=7.03$ | $n_5=1.70154/41.1$ |
| $r_9=43.452$ | $d_9=20.00$ | $n_6=1.51633/64.1$ |
| $r_{10}=-1,369.047$ | $d_{10}=2.98$ | |
| ∞ | 4.20 | Filter |
| ∞ | 13.63 | |
| $r_{11}=-100.179$ | $d_{11}=20.00$ | $n_7=1.56883/56.0$ |
| $r_{12}=-42.000$ | $d_{12}=7.98$ | $n_8=1.76200/40.3$ |
| $r_{13}=163.690$ | $d_{13}=20.00$ | $n_9=1.51633/64.1$ |
| $r_{14}=-63.560$ | $d_{14}=0.20$ | |
| $r_{15}=311.827$ | $d_{15}=20.00$ | $n_{10}=1.58913/61.2$ |
| $r_{16}=-163.292$ | | | wherein $r_i$ is the radius of curvature of the *ith* lens face, $d_i$ is the axial distance between the *ith* lens face and the next successive lens or filter face, the filter having a thickness of 4.20 and its rear face being spaced from the eleventh lens face a distance of 13.63, and $n_n$ is the index of refraction of the *nth* lines.

2. A lens system comprising ten lenses herein consecutively designated from the front to the rear as the first to the tenth lens, the third and fourth lenses, the fifth and sixth lenses, and the seventh, eighth and ninth lenses being cemented along their mating confronting surfaces to form three repsective units, the lens faces being herein consecutively designated as the first to the sixteenth lens face wherein cemented confronting lens surfaces defining single lens faces, said lens system possessing the following dimensions and relationships:

| | | |
|---|---|---|
| $r_1=501.893$ | $d_1=7.98$ | $n_1=1.62041/60.3$ |
| $r_2=85.714$ | $d_2=24.52$ | |
| $r_3=207.565$ | $d_3=7.98$ | $n_2=1.62041/60.3$ |
| $r_4=85.548$ | $d_4=28.99$ | |
| $r_5=-141.113$ | $d_5=7.98$ | $n_3=1.62041/60.3$ |
| $r_6=119.012$ | $d_6=33.99$ | $n_4=1.71736/29.5$ |
| $r_7=-224.405$ | $d_7=0.20$ | |
| $r_8=71.869$ | $d_8=7.03$ | $n_5=1.70154/41.1$ |
| $r_9=43.452$ | $d_9=20.00$ | $n_6=1.51633/64.1$ |
| $r_{10}=-1,369.047$ | $d_{10}=2.98$ | |
| ∞ | 4.20 | Filter |
| ∞ | 13.63 | |
| $r_{11}=-100.179$ | $d_{11}=20.00$ | $n_7=1.56883/56.0$ |
| $r_{12}=-42.000$ | $d_{12}=7.98$ | $n_8=1.76200/40.3$ |
| $r_{13}=163.690$ | $d_{13}=20.00$ | $n_9=1.51633/64.1$ |
| $r_{14}=-63.560$ | $d_{14}=0.20$ | |
| $r_{15}=311.827$ | $d_{15}=20.00$ | $n_{10}=1.58913/61.2$ |
| $r_{16}=-163.417$ | | | wherein $r_i$ is the radius of curvature of the $i$th lens face, $d_i$ is the axial distance between the $i$th lens face and the next successive lens face, and $n_n$ is the index of refraction of the $n$th lens.

References Cited

UNITED STATES PATENTS

| 2,629,285 | 2/1953 | Baker | 350—196 |
| 2,803,997 | 8/1957 | Hopkins | 350—215 X |
| 2,855,824 | 10/1958 | Schade | 350—215 X |
| 3,132,199 | 5/1964 | Zimmermann et al. | 350—215 |
| 3,372,974 | 3/1968 | Tinke | 350—214 X |

DAVID SCHONBERG, Primary Examiner

P. A. SACHER, Assistant Examiner

U.S. Cl. X.R.

350—196